(12) United States Patent
Shimizu et al.

(10) Patent No.: US 11,136,164 B2
(45) Date of Patent: Oct. 5, 2021

(54) BARRIER PAPER AND PAPER CUP

(71) Applicants: TOPPAN PRINTING CO., LTD., Toyko (JP); Nippon Paper Industries Co., Ltd., Tokyo (JP)

(72) Inventors: Kosuke Shimizu, Tokyo (JP); Akiko Saiki, Tokyo (JP); Kaori Yamabe, Tokyo (JP)

(73) Assignees: TOPPAN PRINTING CO., LTD., Tokyo (JP); NIPPON PAPER INDUSTRIES CO., LTD., Tokyo (JP)

( * ) Notice: Subject to any disclaimer, the term of this patent is extended or adjusted under 35 U.S.C. 154(b) by 308 days.

(21) Appl. No.: 16/157,686

(22) Filed: Oct. 11, 2018

(65) Prior Publication Data

US 2019/0077541 A1  Mar. 14, 2019

Related U.S. Application Data

(63) Continuation of application No. PCT/JP2017/015485, filed on Apr. 17, 2017.

(30) Foreign Application Priority Data

Apr. 15, 2016  (JP) ............... JP2016-081993

(51) Int. Cl.
*B65D 5/56* (2006.01)
*D21H 19/34* (2006.01)
(Continued)

(52) U.S. Cl.
CPC .............. *B65D 5/563* (2013.01); *B32B 23/06* (2013.01); *B32B 27/00* (2013.01); *B65D 65/40* (2013.01);
(Continued)

(58) Field of Classification Search
CPC .. B65D 5/563; B65D 2565/382; B32B 23/02; B32B 23/06; B32B 29/02; D21H 11/16;
(Continued)

(56) References Cited

U.S. PATENT DOCUMENTS

2010/0279113 A1* 11/2010 Attal .................. C08L 2666/04
428/365
2013/0000513 A1* 1/2013 Kimura .................... C08J 3/11
106/203.1
(Continued)

FOREIGN PATENT DOCUMENTS

CN          102753752 A      10/2012
EP          2 557 225 A1      2/2013
(Continued)

OTHER PUBLICATIONS

Chinese Office Action dated Aug. 14, 2020, in corresponding Chinese Patent Application No. 201780022737.5.
(Continued)

*Primary Examiner* — Aaron Austin
*Assistant Examiner* — Michael C Romanowski

(57) ABSTRACT

A barrier paper includes a paper base material and a barrier layer containing cellulose fibers formed on the paper base material, in which an integrated value from 10.0 μm to 500.0 μm, obtained from a volume-based particle size distribution diagram when a dispersion containing the cellulose fibers is measured by laser diffraction, is 30% or more.

5 Claims, 2 Drawing Sheets

(51) Int. Cl.
  *D21H 19/84*   (2006.01)
  *D21H 11/18*   (2006.01)
  *B32B 27/00*   (2006.01)
  *B32B 23/06*   (2006.01)
  *B65D 65/40*   (2006.01)

(52) U.S. Cl.
  CPC ............. *D21H 11/18* (2013.01); *D21H 19/34* (2013.01); *D21H 19/84* (2013.01); *B65D 2565/382* (2013.01)

(58) Field of Classification Search
  CPC ........ D21H 11/18; D21H 19/34; D21H 19/52; D21H 27/10; D21H 27/38; C09D 101/02; C08B 11/12
  USPC ................................................ 162/146, 149
  See application file for complete search history.

(56) References Cited

U.S. PATENT DOCUMENTS

| | | | | |
|---|---|---|---|---|
| 2013/0004748 | A1* | 1/2013 | Heiskanen | D01F 6/14 428/196 |
| 2013/0209772 | A1* | 8/2013 | Sandstrom | D21H 11/18 428/220 |
| 2015/0027648 | A1* | 1/2015 | Tsuji | D21H 17/25 162/24 |

FOREIGN PATENT DOCUMENTS

| | | |
|---|---|---|
| JP | 58-214595 | 12/1983 |
| JP | 6-10288 | 1/1994 |
| JP | 7-164591 | 6/1995 |
| JP | 2008-1728 | 1/2008 |
| JP | 2008-308802 | 12/2008 |
| JP | 2012-41489 | 3/2012 |
| JP | 2013-185122 | 9/2013 |
| JP | 2015-227517 | 12/2015 |
| WO | WO 2011/114987 A1 | 9/2011 |

OTHER PUBLICATIONS

International Search Report dated July 18, 2017 in corresponding International Patent Application No. PCT/JP2017/015485.
Written Opinion of International Searching Authority led on Jul. 18, 2017 in corresponding International Patent Application No. PCT/JP2017/015485.

* cited by examiner

BARRIER PAPER AND PAPER CUP

CROSS REFERENCE TO RELATED APPLICATIONS

This application is a continuation application based on a PCT Patent Application No. PCT/JP2017/015485, filed Apr. 17, 2017, whose priority is claimed on Japanese Patent Application No. 2016-081993, filed on Apr. 15, 2016, the contents of which are hereby incorporated by reference.

BACKGROUND OF THE INVENTION

Field of the Invention

The present invention relates to a barrier paper that contains and packages foods and the like and a paper cup composed of that barrier paper.

Description of Related Art

In the field of packaging materials including food packaging materials, the packaging material is required to have a gas barrier property that blocks oxygen and other gases capable of permeating the packaging material in order to protect the contents.

Aluminum and polyvinylidene chloride that are minimally affected by temperature and humidity have conventionally been used as gas barrier materials. However, when these materials are incinerated, incineration residue ends up clogging exhaust ports and the inside of the furnace resulting in the problem of a decrease in incineration efficiency in the case of aluminum, while in the case of polyvinylidene chloride, there is the problem of the generation of dioxins and other harmful substances. Consequently, it has become necessary to switch to gas barrier materials that have a minimal burden on the environment. For example, as is described in Patent Document 1 (Japanese Unexamined Patent Application, First Publication No. H7-164591), even if only a portion of the polyvinylidene chloride is composed of materials made from the same fossil resources, steps are being taken to switch to polyvinyl alcohol or ethylene-vinyl alcohol copolymers that do not contain aluminum or chloride. In addition, petroleum-derived resources are expected to be switched to biomass materials in the future. In addition, petroleum-derived resin films such as those made of polyethylene terephthalate (PET) have conventionally been widely used as the base materials of gas barrier materials. However, the base materials of gas barrier materials are expected to be switched to a typical biomass material in the form of paper and the conversion to paper packaging materials is progressing.

Cellulose-based materials are attracting attention as a novel gas barrier material. Cellulose accounts for roughly half of all biomass materials produced in the world, and in addition to being biodegradable, demonstrates superior physical properties such as a gas barrier property, strength, elastic modulus, dimensional stability, heat resistance and crystallinity. Consequently, cellulose is expected to be applied to functional materials. Known examples of cellulose-based materials include cellulose nanofibers, obtained by dispersing cellulose formed by an oxidation reaction catalyzed by 2,2,6,6-tetramethyl-1-piperidine-N-oxyradical (TEMPO) as described in Patent Document 2 (Japanese Unexamined Patent Application, First Publication No. 2008-308802) and Patent Document 3 (Japanese Unexamined Patent Application, First Publication No. 2008-1728), cellulose nanofibers obtained by introducing a carboxymethyl group into a glucose unit followed by dispersal therein as described in Patent Document 4 (Japanese Unexamined Patent Application, First Publication No. 2013-185122), and cellulose nanofibers obtained by carrying out enzyme treatment and alkaline treatment followed by mechanical fibrillation as described in Patent Document 5 (Japanese Unexamined Patent Application, First Publication No. H6-10288). Gas barrier materials capable of inhibiting transmission rate of oxygen are obtained by coating and laminating these cellulose-based materials on a base material.

However, in the case of using paper for the base material in particular, since there are large surface irregularities resulting in increased susceptibility to the effects of paper fibers in comparison with resin base materials, films containing cellulose fibers are hard and brittle when coated and deposited on paper base materials and the like. Consequently, films containing cellulose fibers are unable to withstand bending, folding or other stress applied during processing and forming of packaging materials resulting in problems such as the formation of cracks and being unable to maintain a barrier property. Moreover, even after having obtained a packaging material by processing and forming, there are cases in which cracks form in the barrier layer and a gas barrier property is unable to be maintained as a result of being unable to withstand the additional weight when contents are placed in the packaging material.

SUMMARY OF THE INVENTION

With the foregoing in view, an object of the present invention is to provide a barrier paper that takes advantage of the bending resistance of long fibers while having a gap-free barrier layer containing cellulose fibers and demonstrating superior bending resistance capable of withstanding bending during processing and forming, and a paper cup formed from that barrier paper.

The barrier paper according to a first aspect of the present invention includes a paper base material and a barrier layer containing cellulose fibers formed on the paper base material, wherein an integrated value from 10.0 μm to 500.0 μm, obtained from a volume-based particle size distribution diagram when a dispersion containing the cellulose fibers is measured by laser diffraction, is 30% or more.

In the aforementioned first aspect, an integrated value of 5 μm or less, obtained from a volume-based particle size distribution diagram when a dispersion containing the cellulose fibers in the barrier layer is measured by laser diffraction, may be 1% to 70%.

In the aforementioned first aspect, a total of the integrated value from 10.0 μm to 500.0 μm and the integrated value of 5.0 μm or less, obtained from a volume-based particle size distribution diagram when a dispersion containing the cellulose fibers in the barrier layer is measured by laser diffraction, may be 31% to 100%.

In the aforementioned first aspect, the barrier layer may have two or more peaks in a volume-based particle size distribution diagram when a dispersion containing the cellulose fibers is measured by laser diffraction.

In the aforementioned first aspect, oxygen transmission rate at 30° C. and 40% RH after having bent with an 8 mm mandrel in compliance with the cylindrical mandrel method defined in JIS K5600-5-1 may be 50 cc/m²·day or less.

In the aforementioned first aspect, a coating amount of the barrier layer in terms of a dry mass thereof may be 0.2 g/m² to 30.0 g/m².

In the aforementioned first aspect, an amount of the cellulose fibers in the barrier layer may be 50% by mass or more.

In the aforementioned first aspect, the barrier layer may contain a water-soluble polymer.

In the aforementioned first aspect, the cellulose fibers may be cellulose fibers having a carboxyl group at a C6 position of cellulose and the water-soluble polymer may be at least one of polyvinyl alcohol and carboxymethyl cellulose, an amount of the cellulose fibers having a carboxyl group at the C6 position of cellulose in the barrier layer may be 50% by mass to 100% by mass, an amount of polyvinyl alcohol in the barrier layer may be 0% by mass to 50% by mass, and an amount of carboxymethyl cellulose in the barrier layer may be 0% by mass to 50% by mass.

In the aforementioned first aspect, the cellulose fibers may be cellulose fibers introduced with a carboxymethyl group, the water-soluble polymer may be at least one of polyvinyl alcohol and carboxymethyl cellulose, an amount of the cellulose fibers introduced with a carboxymethyl group in the barrier layer may be 50% by mass to 99% by mass, an amount of polyvinyl alcohol in the barrier layer may be 0% by mass to 50% by mass, and an amount of carboxymethyl cellulose in the barrier layer may be 0% by mass to 50% by mass.

In the aforementioned first aspect, a basis weight of the paper base material may be 400 g/m$^2$ or less.

The paper cup according to a second aspect of the present invention is formed from the barrier paper according to the aforementioned first aspect, in which the barrier layer is arranged on the inside thereof.

According to the aforementioned aspects of the present invention, cellulose fibers contained in the barrier layer are an integrated value from 10.0 μm to 500.0 μm, obtained from a volume-based particle size distribution diagram when a dispersion containing the cellulose fibers is measured by laser diffraction, is 30% or more. Consequently, a barrier paper can be provided that has a barrier layer that is free of gaps and has superior bending resistance, demonstrates superior a gas barrier property and demonstrates superior bending resistance capable of withstanding bending during processing and forming.

DETAILED DESCRIPTION OF THE INVENTION

Figure 1:
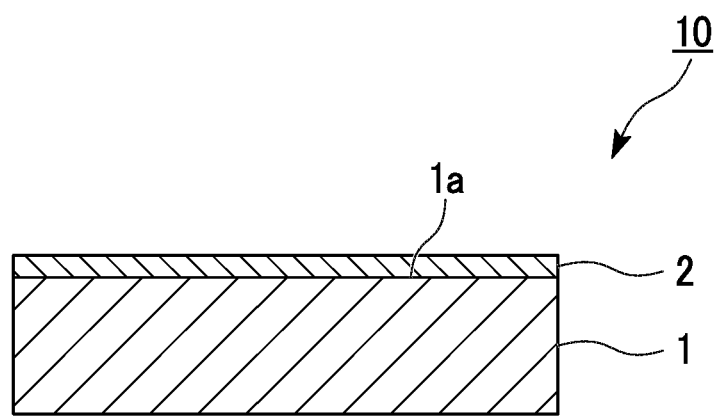
FIG. 1 is a cross-sectional view schematically showing a barrier paper according to a first embodiment of the present invention.

The following provides a detailed explanation of embodiments applying the present invention with reference to the drawings. Furthermore, the drawings used in the following explanation are for explaining the configurations of embodiments of the present invention, and size, thickness or dimensions and so forth of each portion shown in the drawings may differ from dimensional relationships of actual laminates.

Embodiments (Barrier Paper)

FIG. 1 is a cross-sectional view schematically showing a barrier paper according to a first embodiment of the present invention.

A barrier paper 10 according to the present embodiment has a paper base material 1, and a barrier layer 2 containing cellulose fibers formed on the base material 1, namely on one surface 1a of the paper base material.

There are no particular limitations on the paper base material 1 and can be suitably selected from printing paper or packaging paper corresponding to the application. Examples of the material of the paper base material 1 include glassine paper, parchment paper, high-grade printing paper, intermediate-grade printing paper, low-grade printing paper, printing tissue paper, colored high-quality paper, art paper, coated paper, kraft paper, container board, coated cardboard, ivory paper and cup base paper.

The basis weight of the paper base material 1 is preferably 400 g/m$^2$ or less, more preferably 30 g/m$^2$ to 400 g/m$^2$, even more preferably 150 g/m$^2$ to 400 g/m$^2$, and most preferably 180 g/m$^2$ to 400 g/m$^2$.

If the basis weight of the paper base material 1 is 400 g/m$^2$ or less, excessive stress does not act on the barrier layer 2 when the barrier paper 10 is bent. Consequently, cracks attributable to that stress do not form in the barrier layer 2 and there are no decreases in a gas barrier property. In addition, if the basis weight of the paper base material is 400 g/m$^2$ or less, cost increases can be suppressed.

In addition, in the case of using the barrier paper 10 in ordinary packaging applications, the basis weight of the paper base material 1 is preferably 180 g/m$^2$ or more. If the basis weight of the paper base material 1 is 180 g/m$^2$ or more, the paper base material 1 is able to maintain sufficient strength for ordinary packaging applications.

Natural cellulose is used for the cellulose fibers that compose the barrier layer 2. Examples of natural cellulose include various types of wood pulp obtained from needle-leaved tree, broad-leaved tree, and the like, non-wood pulp obtained from kenaf, bagasse, straw, bamboo, cotton or marine plants, cellulose obtained from sea squirts and cellulose produced by microorganisms.

Chemically treated cellulose fibers can also be used for the cellulose fibers as necessary.

Although there are no particular limitations thereon, and an example of a chemical treatment method includes carboxylation by oxidizing cellulose fibers using an oxidizing agent such as sodium hypochlorite or bromide such as sodium bromide while adjusting pH and using the aforementioned TEMPO as a catalyst. According to this method, cellulose fibers are obtained in which the hydroxyl group at the C6 position of cellulose has been carboxylated, or in other words, cellulose fibers having a carboxyl group at the C6 position of cellulose. Since these carboxylated cellulose fibers swell as a result of demonstrating a high degree of electrostatic repulsion among the cellulose fibers, a dispersion of cellulose fibers can be prepared by mechanical treatment using a low level of energy.

In addition, another example of a chemical treatment method includes carboxymethylation of cellulose fibers.

An example of this type of chemical treatment is indicated below.

A mercerizing agent in the form of sodium hydroxide is added and mixed into a solvent containing cellulose fibers to carry out mercerization treatment on the cellulose fibers. Subsequently, a carboxymethylating agent is added at 0.05 times moles to 10.0 times moles per glucose residue and an etherification reaction is carried out to obtain cellulose fibers introduced with a carboxymethyl group. Electrostatic repulsion among the cellulose fibers occurs attributable to the carboxymethyl group thereby facilitating the fiber refinement.

Moreover, an example of another chemical treatment method may include subjecting cellulose fibers to pretreatment such as enzyme treatment, chemical treatment (such as alkaline treatment, acid treatment or swelling chemical treatment) or ozone treatment.

Cellulose fibers obtained by washing the pretreated cellulose fibers or cellulose fibers obtained by refining the cellulose fibers by using the pretreatment solution as a suspension can be used for the material of the barrier layer 2.

A particle diameter of the cellulose fibers can be measured by laser diffraction. In laser diffraction, a particle diameter is calculated from a diffraction pattern of laser light generated by the measured object when treating the measured object as being virtual spherical particles. The vertical axis of a "particle size distribution diagram" obtained by measuring by laser diffraction is a distributed amount based on volume. In the following explanation, this distribution diagram is referred to as a "particle size distribution diagram (volume-based)". In the case of being based on volume, the product of "particle volume" and "number of particles" is determined by calculating the integrated value of the particle size distribution diagram. On the other hand, in the case of a "number-based" integration, only the "number of particles" has an effect when calculating the integrated value of particle size distribution of particles.

In the cellulose fibers contained in the barrier layer 2, the integrated value from 10.0 µm to 500.0 µm, obtained from a particle size distribution diagram (volume-based) when a dispersion containing the cellulose fibers is measured by laser diffraction, is 30% or more, preferably 40% or more and more preferably 50% to 90%. Namely, the integrated value of particles having a diameter of 10.0 µm to 500.0 µm in the dispersion is 30% or more, preferably 40% or more and more preferably 50% to 90% of the integrated value of all particles in the dispersion.

In the case that the integrated value from 10.0 µm to 500.0 µm, obtained from a particle size distribution diagram (volume-based) when a dispersion containing the cellulose fibers contained in the barrier layer 2 is measured by laser diffraction, is less than 30%, the barrier layer 2 does not have sufficient bending resistance, thereby preventing the barrier layer 2 from imparting adequate bending resistance to the barrier paper 10.

In addition, in the barrier layer 2, the integrated value of 5.0 µm or less, obtained from a particle size distribution diagram (volume-based) when a dispersion containing the cellulose fibers contained in the barrier layer 2 is measured by laser diffraction, is preferably 1% to 70% and more preferably 5% to 10%. Namely, the integrated value of particles having a diameter of 5.0 µm or less in the dispersion is preferably 1% to 70%, and more preferably 5% to 10%, of the integrated value of all particles in the dispersion.

If the integrated value of 5.0 µm or less, obtained from a particle size distribution diagram (volume-based) when a dispersion containing the cellulose fibers contained in the barrier layer 2 is measured by laser diffraction, is within the aforementioned ranges, the cellulose fibers are dense and the gaps therebetween are sufficiently small, thereby allowing the formation of the barrier layer 2 having even more superior gas barrier properties and making it possible to impart adequate gas barrier properties to the barrier paper 10.

Moreover, in the barrier layer 2, the total of the integrated value of 10.0 µm to 500.0 µm and the integrated value of 5.0 µm or less, obtained from a particle size distribution diagram (volume-based) when a dispersion containing the cellulose fibers contained in the barrier layer 2 is measured by laser diffraction, is preferably 31% to 100% and more preferably 55% to 100%. Namely, the total of the integrated value of particles having a diameter of 10.0 µm to 500.0 µm in the dispersion and the integrated value of particles having a diameter of 5.0 µm or less is preferably 31% to 100%, and more preferably 55% to 100%, of the volume of all particles in the dispersion.

If the total of the integrated value of 10.0 µm to 500.0 µm and the integrated value of 5.0 µm or less, obtained from a particle size distribution diagram (volume-based) when a dispersion containing the cellulose fibers contained in the barrier layer 2 is measured by laser diffraction, is within the aforementioned ranges, the barrier layer 2 has adequate bending resistance and a gas barrier property. Consequently, the barrier layer 2 is able to impart adequate bending resistance and a gas barrier property to the barrier paper 10.

In this manner, in the barrier paper 10 according to the present embodiment, the barrier layer 2 preferably contains cellulose fibers having different particle diameters.

If the barrier layer 2 contains cellulose fibers having a volume-based particle diameter of 5.0 µm or less, the barrier layer 10 having a favorable gas barrier property can be formed. In addition, if the barrier layer 2 contains cellulose fibers having a volume-based particle diameter of 10.0 µm to 500.0 µm, the barrier paper 10 having bending resistance can be formed.

Furthermore, in the case the barrier layer 2 containing only cellulose fibers having a small particle diameter, bending strength of the barrier layer 2 in the direction of thickness becomes weak and the barrier layer 2 is brittle. On the other hand, in the case the barrier layer 2 contains only cellulose fibers having a large particle diameter, gaps between cellulose fibers in the barrier layer 2 increase, thereby making it difficult to express a high gas barrier property.

Therefore, if the barrier paper 10 is formed so that the barrier layer 2 contains cellulose fibers having a volume-based particle diameter of 5.0 µm or less and cellulose fibers having a volume-based particle diameter of 10.0 µm to 500.0 µm, since gaps between the cellulose fibers having a particle diameter of 10.0 µm to 500.0 µm are filled with cellulose fibers having a particle diameter of 5.0 µm or less, the barrier layer 2 can be formed that has a high gas barrier property and bending resistance.

The barrier layer 2 preferably has two or more peaks in a particle size distribution diagram (volume-based) when a dispersion containing cellulose fibers is measured by laser diffraction.

If two or more peaks are present in a particle size distribution diagram (volume-based) of the cellulose fibers, gaps between cellulose fibers having a large particle diameter can be filled with cellulose fibers having a small particle diameter. Consequently, the barrier layer 2 having a high gas barrier property and bending resistance can be formed.

In the present embodiment, an example of a method used to measure the volume-based particle diameter of cellulose fibers is a method including measuring a dispersion of the cellulose fibers with a laser diffraction particle size analyzer (trade name: SALD-7000H, Shimadzu Corp.).

In this measurement method, approximately 200 mL of pure water are circulated in a cell, a dispersion of cellulose fibers is dropped into the pure water to prepare a solution of cellulose fibers of a concentration enabling measurement, and the volume-based particle diameter of the cellulose fibers contained in the solution is then measured.

The coating amount of the barrier layer 2 in terms of the dry mass thereof is preferably 0.2 g/m$^2$ to 30.0 g/m$^2$ and more preferably 0.4 g/m$^2$ to 2.0 g/m$^2$.

If the coating amount of the barrier layer 2 in terms of the dry mass thereof is 0.2 g/m$^2$ or more, the barrier layer 2 is less susceptible to the occurrence of defects due to the effects of surface irregularities in the paper base material 1, thereby making it possible to improve a gas barrier property of the barrier layer 2. If the coating amount of the barrier layer 2 in terms of the dry mass thereof is 30.0 g/m$^2$ or less, increases in production costs can be suppressed.

The amount of cellulose fibers in the barrier layer 2 is preferably 50% by mass or more, more preferably 60% by mass or more and even more preferably 70% by mass to 99% by mass.

If the amount of cellulose fibers in the barrier layer 2 is 50% by mass or more, bending resistance and a gas barrier property of the barrier layer 2 improve.

Whether or not entanglement of the cellulose fibers is dense can be determined by, for example, observing the surface using a scanning electron microscope (SEM, trade name: S-4800, Hitachi High Technologies Corp.) or measuring specific gravity of a cast film.

Specific gravity of a cast film can be measured using a digital gravimeter (trade name: AND-DMA-220, Ando Keiki Co., Ltd.). A cast film can be produced by pouring a prescribed amount of an aqueous dispersion of cellulose fibers into a square case made of polystyrene followed by heating and drying for 24 hours at 50° C. For example, in the case of particle size distribution when a dispersion containing cellulose fibers is measured by laser diffraction, in the case the peak of volume-based particle diameter of the cellulose fibers is 250 μm and cellulose fibers having a volume-based particle diameter of 5.0 μm or less are not contained, the specific gravity of the cast film is 1.35. On the other hand, in the case of particle size distribution when a dispersion containing cellulose fibers is measured by laser diffraction, peaks of the volume-based particle diameter of the cellulose fibers are present at 0.1 μm and 80.0 μm, and in the case the integrated value of cellulose fibers having a volume-based particle diameter of 5.0 μm or less is 50%, the specific gravity of the cast film is 1.48.

In the barrier layer 2 containing cellulose fiber, according to surface observation, as the number and size of gaps formed between the cellulose fibers become smaller, entanglement of the cellulose fibers becomes dense. In addition, according to measurement of the specific gravity of a cast film, as the specific gravity of the cast film becomes larger, the gaps between the cellulose fibers become smaller and entanglement of the cellulose fibers becomes dense. Thus, by further reducing the size of the gaps between the cellulose fibers, infiltration and permeation water vapor, dirt and other deterioration factors into the barrier layer 2 are inhibited, thereby making it possible to inhibit decreases in a gas barrier property of the barrier layer 2 caused by bending and the like.

Therefore, in the barrier paper 10 according to the present embodiment, a water-soluble polymer having favorable compatibility with cellulose is preferably contained in the barrier layer 2 as a material capable of filling with gaps present between the cellulose fibers contained in the barrier layer 2. The barrier layer 2 containing cellulose fibers and a water-soluble polymer inhibits infiltration and permeation of water vapor, dirt and other deterioration factors, and as a result thereof, inhibits decreases in a gas barrier property caused by bending and the like.

Examples of water-soluble polymers used include polyvinyl alcohol (PVA), ethylene-vinyl alcohol copolymer, carboxymethyl cellulose (CMC), polyacrylic acid, polyacrylamide, polyethylene imine, polyethylene oxide, starch, pectin and alginic acid.

Since these water-soluble polymers demonstrate superior film deposition properties, transparency and flexibility and exhibit favorable compatibility with cellulose fibers, the water-soluble polymers easily fill with gaps between the cellulose fibers, thereby making it possible to form the barrier layer 2 having both strength and adhesiveness. In addition, although polyvinyl alcohol (PVA) is obtained by saponifying polyvinyl acetate, this includes PVA ranging from so-called partially saponified PVA, in which 10% to 20% of the acetic acid groups remain, to completely saponified PVA, in which only 1% to 2% of the acetic acid groups remain.

In the case of using a water-soluble polymer, the mass ratio ((A)/(B)) of cellulose fibers (A) to water-soluble polymer (B) is preferably 50/50 to 99/1.

If the mass ratio of the water-soluble polymer (B) is 1 or more, gaps between the cellulose fibers can be filled with the water-soluble polymer (B). On the other hand, if the mass ratio of the water-soluble polymer (B) is 50 or less, in addition to adhesiveness of the barrier layer 2 to the paper base material 1 improving, there is no occurrence of defects in the barrier layer 2. In addition, decreases in film deposition properties of the barrier layer 2 caused by an excess amount of coating solution serving as the material of the barrier layer 2 soaking into the paper base material 1 can be inhibited.

In the barrier layer 2, it is preferable that the cellulose fibers be cellulose fibers in which the hydroxyl group at the C6 position of cellulose has been carboxylated, the water-soluble polymer be at least one of polyvinyl alcohol and carboxymethyl cellulose, the amount of cellulose fibers in the barrier layer 2 in which the hydroxyl group at position C6 of cellulose is carboxylated be 50% by mass to 100% by mass, the amount of polyvinyl alcohol in the barrier layer 2 be 0% by mass to 50% by mass, and the amount of carboxymethyl cellulose in the barrier layer 2 be 0% by mass to 50% by mass. At this time, the amount of the aforementioned carboxylated cellulose fibers is more preferably 50% by mass to 99% by mass, and the amount of polyvinyl alcohol in the barrier layer is more preferably 1% by mass to 50% by mass, and the amount of carboxymethyl cellulose in the barrier layer is more preferably 1% by mass to 50% by mass.

As a result of employing the aforementioned configuration for the barrier layer 2, a gas barrier property and bending resistance are further improved.

In the barrier layer 2, it is preferable that the cellulose fibers be cellulose fibers introduced with a carboxymethyl group, the water-soluble polymer be at least one of polyvinyl alcohol and carboxymethyl cellulose, the amount of cellulose fibers introduced with a carboxymethyl group in the barrier layer 2 be 50% by mass to 99% by mass, the amount of polyvinyl alcohol in the barrier layer 2 be 0% by mass to 50% by mass, and the amount of carboxymethyl cellulose in the barrier layer 2 be 0% by mass to 50% by mass. At this time, the amount of cellulose fibers introduced with a carboxymethyl group is more preferably 50% by mass to 99% by mass, the amount of polyvinyl alcohol in the barrier layer is more preferably 1% by mass to 50% by mass, and the amount of carboxymethyl cellulose in the barrier layer is more preferably 1% by mass to 50% by mass.

As a result of employing the aforementioned configuration of the barrier layer 2, gas barrier properties and bending resistance are further improved.

In the barrier paper 10 according to the present embodiment, the oxygen transmission rate thereof at 30° C. and 40% RH after having bent with an 8 mm mandrel in compliance with JIS K5600-5-1: 1999 entitled "Testing methods for paints—Part 5: Mechanical property of film—Section 1: Bend test (cylindrical mandrel)" is preferably 50 cc/m²·day or less and more preferably 30 cc/m²·day or less.

If oxygen transmission rate after bending is within the aforementioned ranges, the barrier paper 10 is able to demonstrate a favorable gas barrier property even after processing and forming.

The following effects are obtained according to the barrier paper 10 according to the present embodiment. Namely, the integrated value from 10.0 µm to 500.0 µm, obtained from a volume-based particle size distribution diagram when a dispersion containing the cellulose fibers to be contained in the barrier layer 2 is measured by laser diffraction, is 30% or more. Consequently, the barrier paper 10 can be provided that has the barrier layer 2 that is free of gaps, has superior gas barrier properties and demonstrates superior bending resistance capable of withstanding bending and folding during processing and forming, thereby enabling the barrier paper 10 to demonstrate superior gas barrier properties as well as superior bending resistance capable of withstanding bending and folding during processing and forming. In addition, since the barrier layer 2 contains cellulose fibers, the barrier paper 10 can be provided that places a minimal burden on the environment.

(Barrier Paper Production Method)

The following provides an explanation of a method of producing the barrier paper 10 according to the present embodiment with reference to FIG. 1.

First, the cellulose fibers are refined (fibrillated) (cellulose fiber fibrillation step).

There are no particular limitations on the method used to refine the cellulose fibers and examples thereof include mechanical treatment using a dispersing device such as a high-pressure homogenizer, ultrasonic homogenizer, grinder attritor, freeze crusher or media mill.

In addition, the cellulose fibers may be subjected to chemical treatment as previously described as a preliminary step to mechanical treatment. Cellulose fibers having a desired fiber shape or particle diameter can be obtained by arbitrarily controlling the degree of mechanical treatment or chemical treatment.

In order to obtain cellulose fibers in which the integrated value from 10.0 µm to 500.0 µm, obtained from a particle size distribution diagram (volume-based) when a dispersion containing the cellulose fibers is measured by laser diffraction, is 30% or more and the integrated value of 5 µm or less is 1% to 70% in the present embodiment, it is necessary to discontinue refinement treatment prior to the cellulose fibers being uniformly refined.

An example of a method used to refine cellulose fibers includes subjecting a dispersion (suspension) obtained by dispersing pulp (cellulose fibers), which has undergone chemical treatment using the aforementioned TEMPO catalyst, in water to long-term treatment with a high-pressure homogenizer. The high-pressure homogenizer carries out refinement by applying high pressure to the raw material and forcing it to pass through the aperture of a nozzle. Each time the raw material passes through the nozzle is referred to as one pass. The expression two passes is used when recovering raw material that has undergone one round of treatment and again subjecting to the same treatment. According to this method, a dispersion can be prepared that contains uniform cellulose fibers having a volume-based particle diameter of approximately 0.02 µm. However, if refinement treatment is discontinued prior to the cellulose fibers becoming uniform, a dispersion can be prepared that contains cellulose fibers in which a peak of a volume-based particle diameter of 10.0 µm to 500.0 µm and a peak of a volume-based particle diameter of 5.0 µm or less are present in a particle size distribution when a dispersion containing cellulose fibers is measured by laser diffraction.

In addition, a dispersion containing cellulose fibers having two or more types of volume-based particle diameters can be prepared by mixing two or more types of cellulose dispersions containing cellulose fibers having various volume-based particle diameters prepared according to the aforementioned mechanical treatment. Since the cellulose fiber defibrillation process is different for each mechanical treatment, the desired density and bending resistance of the ultimately obtained barrier layer 2 can be obtained according to the combination of mechanical treatment used.

In addition, the cellulose fibers may also be subjected to chemical treatment as previously described in addition to refinement treatment of the cellulose fibers.

At this time, refinement treatment and chemical treatment of the cellulose fibers are carried out by adding a compound used for the aforementioned chemical treatment to a dispersion of cellulose fibers followed by the use of that dispersion.

Next, a coating solution containing cellulose fibers is prepared by using refined cellulose fibers or a dispersion containing those cellulose fibers obtained in the aforementioned cellulose fiber refinement step (coating solution preparation step).

In the case of using refined cellulose fibers obtained in the cellulose fiber refinement step, the cellulose fibers are preliminarily dispersed in water to prepare a dispersion containing the cellulose fibers.

In this coating solution preparation step, a dispersion containing cellulose fibers and an aqueous solution containing the aforementioned water-soluble polymer are preferably mixed to prepare the coating solution.

In the case of mixing a dispersion containing cellulose fibers and an aqueous solution containing a water-soluble polymer, the ratio ((A)/(B)) of cellulose fibers (A) to water-soluble polymer (B) is preferably 50/50 to 99/1 as previously described.

Next, the coating solution obtained in the aforementioned coating solution preparation step is coated onto one surface 1a of the paper base material 1 to form a coating film formed of that coating solution on the one surface 1a of the paper base material 1 followed by drying the coating film to form the barrier layer 2 (barrier layer formation step).

As a result, the barrier paper 10 is obtained having the paper base material 1 and the barrier layer 2 containing cellulose fibers formed on the one surface 1a of the paper base material 1.

There are no particular limitations on the method used to coat the coating solution on the one surface 1a of the paper base material 1 and a known coating method can be used. Examples of coating methods used include those using a coating device such as a roll coater, reverse roll coater, gravure coater, micro-gravure coater, knife coater, bar coater, wire bar coater, die coater or dip coater.

Examples of methods used to dry the coating film coated on the one surface 1a of the paper base material 1 include air drying, blow drying, hot air drying, UV drying, hot roller drying and infrared drying.

The drying temperature is preferably 100° C. to 180° C. If the drying temperature is 100° C. or higher, moisture present in the film is able to escape, thereby increasing the number of hydrogen bonds between cellulose molecules, enhancing cohesive strength of the barrier layer 2 and improving bending resistance. On the other hand, if the drying temperature is 180° C. or lower, discoloration of the barrier layer 2 caused by thermal degradation can be prevented.

(Paper Cup)

The paper cup according to the present embodiment is formed from the barrier paper 10 of the present embodiment and has the barrier layer 2 arranged on the inside thereof.

Figure 3:
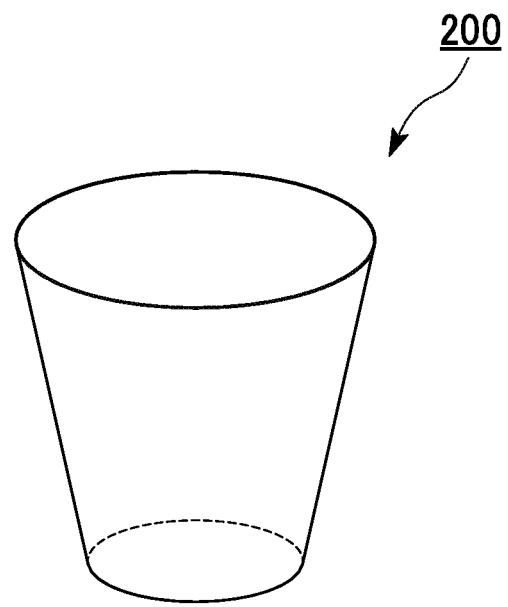
FIG. 3 is a perspective view schematically showing a paper cup according to the first embodiment of the present invention.

Since a paper cup 200 according to the present embodiment (see FIG. 3) is formed from the barrier paper 10 of the present embodiment and has the barrier layer 2 arranged on the inside thereof, the paper cup 200 demonstrates a superior gas barrier property and bending resistance.

Figure 2:
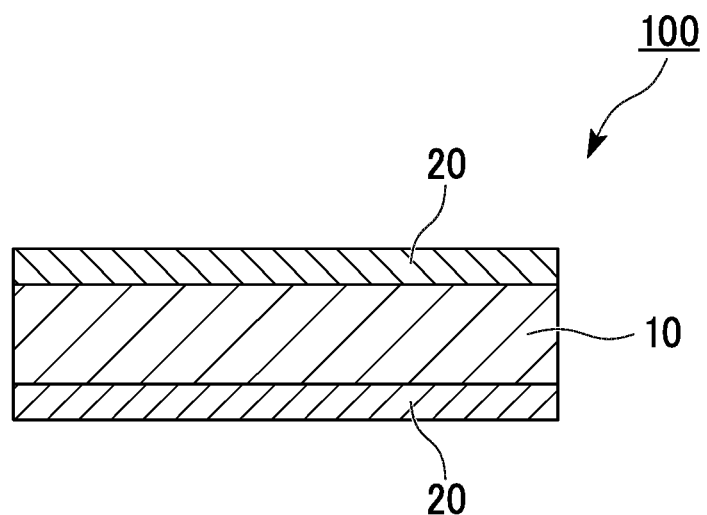
FIG. 2 is drawing schematically showing a sheet material according to the first embodiment of the present invention.

The paper cup 200 according to the present embodiment can be formed from a sheet material 100 (see FIG. 2) obtained by laminating layers 20 formed from a resin (to be referred to as the "resin layer") on the barrier paper 10 of the present embodiment. As shown in FIG. 2, the resin layers 20 are formed on the barrier layer 2 and the paper base material 1 of the barrier paper 10.

There are no particular limitations on the material of the resin layer 20 and a known material such as polyolefin-based resin, epoxy-based resin, urethane-based resin, isocyanate-based resin, polyester-based resin or plant-derived resin materials (bioplastics) can be used.

A resin capable of being heat-sealed can also be used for the material of the resin layer 20. Although the resin capable of being heat-sealed can be selected from polyethylene-based resins such as low density polyethylene resin (LDPE), medium density polyethylene resin (MDPE), high density polyethylene resin (HDPE) or linear low density polyethylene resin (LLDPE), and polypropylene-based resins such as polypropylene resin, propylene-ethylene random copolymers or propylene-ethylene block copolymers, linear low density polyethylene resin (LLDPE) is preferable from the viewpoints of workability, processing adaptability and economy.

The resin layer 20 can be formed with a method used to produce packaging materials, examples of which include wet lamination, dry lamination, solvent-free lamination, thermal lamination and melt extrusion lamination.

When forming the resin layer 20 on the barrier layer 2, the barrier layer 2 may be subjected to known surface treatment such as corona treatment, ozone treatment, plasma treatment, glow discharge treatment or oxidation treatment using a chemical oxidizing agent in order to improve adhesiveness. Alternatively, a primer coat layer, anchor coat layer or adhesive layer and the like may be arbitrarily formed between the barrier layer 2 and the resin layer 20. Moreover, a printing layer or antistatic layer and the like may be laminated as necessary.

When fabricating the paper cup 200, a body material stamped out from the sheet material 100 with a punching die and a bottom member similarly fabricated from the laminate (sheet material 100) are formed into the shape of a cup with a cup molding machine.

Next, a separately fabricated lid material is removably sealed to seal the cup and obtain the paper cup 200.

Here, the body material, bottom member and lid material are not all required to be formed of the barrier paper of the present embodiment, but rather different materials may be used as necessary.

Furthermore, the present invention is not limited to the aforementioned embodiments, and can be modified in various ways within a range that does not deviate from the present invention. In addition, the specific configurations, materials and so forth of each component are not limited to those exemplified in the aforementioned embodiments, but rather can be altered as is suitable.

EXAMPLES

Although the following provides a more detailed explanation of the present invention, the present invention is not limited by these examples.

[Method for Preparing Dispersion Containing Cellulose Fibers 1 (Preparation Method 1)]

5.00 g (bone dry) of bleached and unbeaten needle-leaved tree kraft pulp (whiteness: 85%) were added to 500 ml of an aqueous solution obtained by dissolving 39 mg (0.05 mmol to 1 g of cellulose, bone dry) of TEMPO (Sigma-Aldrich) and 514 mg (1.0 mmol to 1 g of cellulose, bone dry) of sodium bromide followed by stirring until the pulp was uniformly dispersed.

Aqueous sodium hypochlorite solution was added to the reaction system so that the concentration of sodium hypochlorite was 5.5 mmol/g followed by initiating the oxidation reaction at room temperature. Although the pH of the system decreased during the course of the reaction, pH was adjusted so as to be pH 10 by successively adding 3 M aqueous sodium hydroxide solution. The reaction ended at the point the sodium hypochlorite was consumed and the pH of the system no longer changed.

After filtering the mixture with a glass filter following the reaction, the mixture was washed with an adequate amount of water and filtered twice to obtain oxidized cellulose fibers impregnated with water and having a solid content of 10% by mass. The yield of pulp at this time was 90%, the amount of time required for the oxidation reaction was 90 minutes, and the amount of carboxyl groups was 1.68 mmol/g. The oxidized pulp obtained in the aforementioned step was adjusted to 1.0% (w/v) with water and treated twice with a high-pressure homogenizer (20° C., 150 MPa) to obtain a dispersion containing cellulose fibers.

[Method for Preparing Dispersion Containing Cellulose Fibers 2 (Preparation Method 2)]

200 g (dry mass) of bleached and unbeaten needle-leaved tree kraft pulp (whiteness: 85%) and 111 g (dry mass) of sodium hydroxide were added to a stirrer capable of mixing pulp followed by the addition of water so that the pulp solid content was 20% (w/v).

Subsequently, after stirring for 30 minutes at 30° C., 216 g (amount as active ingredient) of sodium monochloroacetate were added. After stirring for 30 minutes, the mixture was heated to 70° C. and stirred for 1 hour.

Subsequently, the reaction product was removed, neutralized and washed to obtain carboxymethylated pulp having a degree of carboxymethyl substitution per glucose unit of 0.25.

Subsequently, the carboxymethylated pulp was adjusted to a solid content of 1% with ion exchange water followed by stirring for approximately 20 minutes using a high-speed rotary mixer to obtain a clouded dispersion containing cellulose fibers.

[Method for Preparing Dispersion Containing Cellulose Fibers 3 (Preparation Method 3)]

10 g of bleached kraft pulp were immersed in 500 mL of water, and after stirring ion exchange water containing this bleached kraft pulp for 5 minutes with a high-speed rotary mixer, the mixture was allowed to stand undisturbed for 3 days to allow the bleached kraft pulp to become sufficiently swollen with water and prepare a pulp suspension.

Moreover, after adding water to this pulp suspension to a solid concentration of 1%, treatment with a whetstone was repeated 15 times using a millstone-type attritor (trade name: Supermasscolloider MK CA6-2, Masuko Sangyo Co., Ltd.) to obtain a white cream-shaped dispersion containing cellulose fibers.

[Comparative Method for Preparing Dispersion Containing Cellulose Fibers 1 (Comparative Preparation Method 1)]

A clear dispersion containing cellulose fibers was obtained in the same manner as Preparation Example 1 with the exception of using a high-pressure homogenizer and treating the ion exchange water containing pulp for 10 passes.

[Comparative Method for Preparing Dispersion Containing Cellulose Fibers 2 (Comparative Preparation Method 2)]

A clear dispersion containing cellulose fibers was obtained by carrying out dispersion treatment on the dispersion containing cellulose fibers obtained in Preparation Example 2 for an additional 20 minutes using an ultrasonic homogenizer.

[Comparative Method for Preparing Dispersion Containing Cellulose Fibers 3 (Comparative Preparation Method 3)]

A white cream-shaped dispersion containing cellulose fibers was obtained in the same manner as Preparation Example 3 with the exception of carrying out treatment with the whetstone only twice.

[Evaluation 1]

The volume-based particle diameters of the cellulose fibers contained in the dispersions obtained in Preparation Methods 1 to 3 and Comparative Preparation Methods 1 to 3 were evaluated in accordance with the method indicated below.

Volume-based particle diameter of cellulose fibers was determined by measuring the aforementioned dispersion of cellulose fibers using a laser diffraction particle size analyzer (trade name: SALD-7000H, Shimadzu Corp.).

According to this measurement method, approximately 200 mL of pure water were circulated in a cell followed by dropping a dispersion of cellulose fibers into the pure water to prepare a solution of cellulose fibers in the cell that enables measurement of concentration and then measuring the volume-based particle diameter of the cellulose fibers contained in that solution. The locations of particle diameter peaks and integrated values of each particle diameter are read from the resulting particle size distribution diagram.

In addition, the results of measuring the volume-based particle diameters of the cellulose fibers contained in the dispersions obtained in Preparation Examples 1 to 3 and Comparative Preparation Examples 1 to 3 are shown in Table 1.

[Method for Preparing Aqueous Polyvinyl Alcohol Solution]

5 g of commercially available polyvinyl alcohol (trade name: PVA-124, Kuraray Co., Ltd.) were weighed out in a beaker followed by the addition of pure water to bring to a weight of 500 g. This was then stirred while heating to 100° C. to dissolve the polyvinyl alcohol in the pure water and prepare a 1% by mass aqueous polyvinyl alcohol solution.

[Method for Preparing Aqueous Carboxymethyl Cellulose Solution]

5 g of commercially available carboxymethyl cellulose (trade name: F10LC, Nippon Paper Industries Co., Ltd.) were weighed out in a beaker followed by the addition of pure water to bring to a weight of 500 g. This was then stirred while heating to 100° C. to dissolve the carboxymethyl cellulose in the pure water and prepare a 1% by mass aqueous carboxymethyl cellulose solution.

[Preparation Method for Coating Solution 1]

The dispersion containing cellulose fibers obtained in Preparation Method 1 was used as Coating Solution 1.

[Preparation Method for Coating Solutions 2-7]

100 g of each of the dispersions obtained in Preparation Methods 1 to 3 and the dispersions obtained in Comparative Preparation Methods 1 to 3 were sampled followed by the addition of 100 g of the aforementioned aqueous polyvinyl alcohol solution to each dispersion and stirring the resulting mixtures for 30 minutes with a stirrer to prepare Coating Solutions 2 to 7.

The mixture containing the dispersion obtained in Preparation Example 1 was used as Coating Solution 2, the mixture containing the dispersion obtained in Preparation Example 2 was used as Coating Solution 3, the mixture containing the dispersion obtained in Preparation Example 3 was used as Coating Solution 4, the mixture containing the dispersion obtained in Comparative Preparation Example 1 was used as Coating Solution 5, the mixture containing the dispersion obtained in Comparative Preparation Example 2 was used as Coating Solution 6, and the mixture containing the dispersion obtained in Comparative Preparation Example 3 was used as Coating Solution 7.

[Preparation Method for Coating Solutions 8 to 13]

100 g of each of the dispersions obtained in Preparation Methods 1 to 3 and the dispersions obtained in Comparative Preparation Methods 1 to 3 were sampled followed by the addition of 100 g of the aforementioned aqueous carboxymethyl cellulose solution to each dispersion and stirring the resulting mixtures for 30 minutes with a stirrer to prepare Coating Solutions 8 to 13.

The mixture containing the dispersion obtained in Preparation Example 1 was used as Coating Solution 8, the mixture containing the dispersion obtained in Preparation Example 2 was used as Coating Solution 9, the mixture containing the dispersion obtained in Preparation Example 3 was used as Coating Solution 10, the mixture containing the dispersion obtained in Comparative Preparation Example 1 was used as Coating Solution 11, the mixture containing the dispersion obtained in Comparative Preparation Example 2 was used as Coating Solution 12, and the mixture containing the dispersion obtained in Comparative Preparation Example 3 was used as Coating Solution 13.

[Fabrication of Barrier Paper of Examples 1 to 7]

After coating Coating Solutions 1 to 4 and Coating Solutions 8 to 10 onto a cup base paper (basis weight: 280 g/m$^2$, Nippon Paper Industries Co., Ltd.) base material by bar coating to form coating films thereon, the coating films were dried for 10 minutes at 150° C. to obtain barrier paper having a barrier layer formed on the cup base paper base material.

The coating amounts (dry mass) of the barrier layers are shown in Table 2.

[Fabrication of Barrier Paper of Comparative Examples 1 to 7]

After coating Coating Solution 1, Coating Solutions 5 to 7 and Coating Solutions 11 to 13 onto a cup base paper (basis weight: 280 g/m$^2$, Nippon Paper Industries Co., Ltd.) base material by bar coating to form coating films thereon, the coating films were dried for 10 minutes at 150° C. to obtain barrier paper having a barrier layer formed on the cup base paper base material.

The coating amounts (dry mass) of the barrier layers are shown in Table 2.

[Evaluation 2]

Bending resistance of the barrier paper obtained in Examples 1 to 7 and Comparative Examples 1 to 7 was evaluated in accordance with the method indicated below.

[Bending Resistance Test]

The moisture contents of the barrier paper obtained in Examples 1 to 7 and Comparative Examples 1 to 7 were adjusted for 6 hours or more in an environment at 23° C. and 50% RH followed by bending by wrapping around an 8 mm mandrel in compliance with JIS K5600-5-1: 1999 entitled "Testing methods for paints—Part 5: Mechanical property of film—Section 1: Bend test (cylindrical mandrel)".

[Measurement of Oxygen Transmission Rate (Isobaric Method)]

Oxygen transmission rate (cc/m2·day) before and after the aforementioned bending resistance test was measured for the barrier paper obtained in Examples 1 to 7 and Comparative Examples 1 to 7 in accordance with the method indicated below.

The oxygen transmission rate of the barrier paper was measured in an environment at 30° C. and 40% RH using a MOCON oxygen transmission rate analyzer (trade name: OX-TRAN 2/21, Modern Controls Inc.).

The results are shown in Table 2.

TABLE 1

|  | Cellulose fiber particle diameter peak (1) (μm) | Cellulose fiber particle diameter peak (2) (μm) | Integrated value of volume-based particle diameter of 10 μm to 500 μm (%) | Integrated value of volume-based particle diameter of 5 μm or less (%) |
|---|---|---|---|---|
| Preparation Method 1 | 0.31 | 33 | 30 | 60 |
| Preparation Method 2 | 0.38 | 46 | 50 | 45 |
| Preparation Method 3 | 5.5 | 160 | 90 | 5 |
| Comparative Preparation Method 1 | 0.11 | — | 0 | 100 |
| Comparative Preparation Method 2 | 0.25 | — | 20 | 75 |
| Comparative Preparation Method 3 | 400 | — | 20 | 0 |

TABLE 2

|  | Coating solution | Coating amount (dry mass) (g/m$^2$) | Oxygen transmission rate (cc/m$^2$·day) Before bending | Oxygen transmission rate (cc/m$^2$·day) After bending |
|---|---|---|---|---|
| Example 1 | 1 | 1.1 | 1.6 | 47.8 |
| Example 2 | 2 | 1.0 | 3.8 | 9.6 |
| Example 3 | 3 | 1.2 | 3.5 | 6.8 |
| Example 4 | 4 | 1.1 | 9.4 | 22.3 |
| Example 5 | 8 | 1.1 | 5.5 | 11.8 |
| Example 6 | 9 | 1.3 | 5.1 | 9.1 |
| Example 7 | 10 | 0.9 | 11.1 | 29.5 |
| Comparative Example 1 | 1 | 0.1 | 15.3 | >100 |
| Comparative Example 2 | 5 | 1.0 | 3.1 | 76.9 |
| Comparative Example 3 | 6 | 1.1 | 3.2 | 63.5 |
| Comparative Example 4 | 7 | 0.9 | >100 | >100 |
| Comparative Example 5 | 11 | 1.2 | 3.3 | 80.9 |
| Comparative Example 6 | 12 | 1.0 | 3.4 | 65.2 |
| Comparative Example 7 | 13 | 1.1 | >100 | >100 |

Based on the results of Table 1 and Table 2, the barrier paper of Examples 1 to 7 fabricated using a coating solution containing cellulose fibers for which the integrated value from 10.0 μm to 500.0 μm, obtained from a particle size distribution diagram (volume-based) when a dispersion containing the cellulose fibers was measured by laser diffraction, was 30% or more was determined to demonstrate a lower oxygen transmission rate after bending and maintain a gas barrier property after bending in comparison with before bending.

In contrast, although the barrier paper of Comparative Examples 2, 3, 5 and 6 fabricated using a coating solution containing cellulose fibers having a comparatively small volume-based diameter demonstrated favorable a gas barrier property before bending, cracks formed in the barrier layer as a result of bending and a gas barrier property was determined to decrease considerably.

In addition, since the barrier paper of Comparative Examples 4 and 7 fabricated using a coating solution containing only cellulose fibers having a comparatively large volume-based particle diameter had large gaps in the barrier layer and demonstrated high oxygen transmission rates, the gas barrier property of this barrier paper was determined to be low.

In addition, since the coating amount of the coating solution was low in the barrier paper of Comparative Example 1, the barrier layer was susceptible to the formation of defects and an initial gas barrier property was low. Moreover, since cracks easily penetrated the barrier layer after bending in the barrier paper of Comparative Example 1, oxygen transmission rate increased and a gas barrier property was determined to be low.

Based on the above results, the barrier layer was determined to have bending resistance since the integrated value from 10.0 μm to 500.0 μm, obtained from a particle size distribution diagram (volume-based) when a dispersion containing the cellulose fibers contained in the barrier layer is measured by laser diffraction, is 30% or more. In addition, a gas barrier property of the barrier layer was determined to further improve if the integrated value of 5.0 μm or less, obtained from a particle size distribution diagram (volume-based) when a dispersion containing the aforementioned cellulose fibers is measured by laser diffraction, is 1% to 70%. Moreover, since barrier paper having such a barrier layer undergoes only a small decrease in a gas barrier property after bending, even if a packaging container is formed using that barrier paper, the packaging container has adequate strength and is able to withstand practical use.

INDUSTRIAL APPLICABILITY

Since the barrier paper of the present invention demonstrates superior gas impermeability and bending resistance, it can be applied to various fields such as containers and packaging materials for foods, toiletry articles, chemicals, pharmaceuticals or electronic members.

What is claimed is:

1. A barrier paper comprising:
a paper base material; and
a barrier layer containing cellulose fibers, the barrier layer formed on the paper base material, the barrier layer being formed from a dispersion containing the cellulose fibers, the cellulose fibers including:
fibers having a calculated spherical particle diameter of from 10.0 μm to 500.0 μm and being present in an amount of 50 vol. % to 90 vol. % relative to 100 vol. % of the cellulose fibers contained in the barrier layer, and
fibers having a calculated spherical particle diameter of 5 μm or less and being present in an amount of 5 vol. % to 10 vol. % relative to 100 vol. % of the cellulose fibers in the barrier layer;
where the calculated spherical particle diameters are determined by laser diffraction of the dispersion, and
where the amounts are calculated from an integrated value of a volume-based particle size distribution diagram obtained from the laser diffraction, wherein
the barrier layer includes water-soluble polymers,
the cellulose fibers each include a carboxymethyl group,
the water-soluble polymers include polyvinyl alcohol and carboxymethyl cellulose,
an amount of the cellulose fibers in the barrier layer is from 50% by mass to 99% by mass relative to the total mass of the barrier layer, and
an amount of the polyvinyl alcohol and carboxymethyl cellulose in the barrier layer is from 1% by mass to 50% by mass relative to the total mass of the barrier layer,
wherein the barrier paper exhibits an oxygen transmission rate of 50 cc/m$^2$·day or less and 6.8 cc/m$^2$·day or more at 30° C. and 40% relative humidity (RH) after having been bent with an 8 mm mandrel in compliance with the cylindrical mandrel method defined in JIS K5600-5-1.

2. The barrier paper according to claim 1, wherein the volume-based particle size distribution diagram obtained by laser diffraction of the dispersion containing the cellulose fibers exhibits two or more peaks.

3. The barrier paper according to claim 1, wherein a coating amount of the barrier layer in terms of a dry mass thereof is 0.2 g/m$^2$ to 30.0 g/m$^2$.

4. The barrier paper according to claim 1, wherein a basis weight of the paper base material is 400 g/m$^2$ or less.

5. A paper cup formed from the barrier paper according to claim 1, wherein the barrier layer is arranged on the inside thereof.

* * * * *

UNITED STATES PATENT AND TRADEMARK OFFICE
CERTIFICATE OF CORRECTION

| | | |
|---|---|---|
| PATENT NO. | : 11,136,164 B2 | Page 1 of 1 |
| APPLICATION NO. | : 16/157686 | |
| DATED | : October 5, 2021 | |
| INVENTOR(S) | : Kosuke Shimizu et al. | |

It is certified that error appears in the above-identified patent and that said Letters Patent is hereby corrected as shown below:

On the Title Page

Item (71), in the 1st Applicant's address replace "Toyko (JP)" with "Tokyo (JP)"

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*